US 8,476,330 B2
Jul. 2, 2013

(12) United States Patent
Dimitroff

(54) POLYURETHANE FOAM CONTAINING SYNERGISTIC SURFACTANT COMBINATIONS AND PROCESS FOR MAKING SAME

(75) Inventor: Michael Angelo Dimitroff, Vienna, WV (US)

(73) Assignee: Momentive Performance Materials Inc., Waterford, NY (US)

( * ) Notice: Subject to any disclaimer, the term of this patent is extended or adjusted under 35 U.S.C. 154(b) by 834 days.

(21) Appl. No.: 11/827,943

(22) Filed: Jul. 13, 2007

(65) Prior Publication Data

US 2009/0018226 A1 Jan. 15, 2009

(51) Int. Cl.
*C08G 18/61* (2006.01)
*C08G 18/77* (2006.01)
*C08G 77/16* (2006.01)
*C08G 77/18* (2006.01)
*C08G 77/388* (2006.01)
*C08G 77/458* (2006.01)

(52) U.S. Cl.
USPC ........... 521/174; 521/110; 521/112; 521/122; 521/133; 521/154

(58) Field of Classification Search
USPC ................ 521/137, 110, 112, 122, 133, 154, 521/174
See application file for complete search history.

(56) References Cited

U.S. PATENT DOCUMENTS

| | | | |
|---|---|---|---|
| 3,846,462 A | 11/1974 | Prokai et al. | |
| 3,935,123 A | 1/1976 | Prokai et al. | |
| 3,947,386 A | 3/1976 | Prokai et al. | |
| 3,957,842 A * | 5/1976 | Prokai et al. | 556/444 |
| 4,014,825 A | 3/1977 | Kanner | |
| 4,022,722 A | 5/1977 | Prokai et al. | |
| 4,022,941 A | 5/1977 | Prokai et al. | |
| 4,150,048 A | 4/1979 | Schilling, Jr. et al. | |
| 4,275,172 A * | 6/1981 | Barth et al. | 521/112 |
| 4,309,508 A | 1/1982 | Baskent et al. | |
| 4,483,894 A | 11/1984 | Porter et al. | |
| 5,081,211 A * | 1/1992 | Cassidy et al. | 528/67 |
| 5,192,812 A | 3/1993 | Farris et al. | |
| 5,869,727 A | 2/1999 | Crane et al. | |
| 6,372,810 B2 | 4/2002 | Kazmierski et al. | |
| 6,790,872 B2 * | 9/2004 | Kazmierski et al. | 521/130 |
| 2006/0079591 A1 * | 4/2006 | Anderson et al. | 521/174 |
| 2007/0049717 A1 | 3/2007 | Knott et al. | |

FOREIGN PATENT DOCUMENTS

| | | |
|---|---|---|
| DE | 198 36 260 | 2/2000 |
| EP | 1 029 878 A1 | 8/2000 |
| WO | WO 86/04923 | 8/1986 |

OTHER PUBLICATIONS

Momentive Performance Materials, Material Safety Data Sheet for Niax*L-620, Aug. 23, 2007.*

* cited by examiner

*Primary Examiner* — Randy Gulakowski
*Assistant Examiner* — Kara Boyle
(74) *Attorney, Agent, or Firm* — Joseph E. Waters

(57) ABSTRACT

The present invention relates to a composition and process for preparing fine-celled polyurethane foam obtained from frothing a polyurethane foam-forming composition possessing a synergistic combination of silicone surfactants.

52 Claims, No Drawings

POLYURETHANE FOAM CONTAINING SYNERGISTIC SURFACTANT COMBINATIONS AND PROCESS FOR MAKING SAME

FIELD OF INVENTION

The present invention relates to fine-celled polyurethane foam. More particularly, the present invention provides a fine-celled polyurethane foam obtained from mechanically frothing a polyurethane foam-forming composition possessing a synergistic combination of silicone surfactants.

BACKGROUND OF THE INVENTION

Mechanically frothed foams have been limited in density reduction in part due to limitations of current surfactant technology used for mechanically frothed foams. Typically the surfactants used for the mechanically frothed foam processes are polydimethylsiloxane/polyether repeating block or $(AB)_n$-type copolymer. For example, hydrolyzable $(AB)_n$ surfactants are disclosed in U.S. Pat. No. 3,947,386 and non-hydrolyzable $(AB)_n$ surfactants are disclosed in U.S. Pat. No. 3,957,842, both for use in the mechanical froth foam process. The use of either hydrolyzable or non-hydrolyzable $(AB)_n$ surfactants in making foam articles including carpet backing is described U.S. Pat. Nos. 4,022,722 and 4,022,941. Furthermore, processes for making $(AB)_n$ surfactants are described in U.S. Pat. Nos. 5,869,727 and 4,150,048.

One attempt to lower foam density is by using chemical blowing from the reaction of water with isocyanate as described in U.S. Pat. Nos. 6,790,872 and 6,372,810, however, these processes are limited in density reduction in part to the physical limitations of the current surfactant technology. These two patents describe the use of a single surfactant in the composition along with water used for the reaction of water with isocyanate to give added blowing and density reduction.

Processes for making $CB(AB)_nC$ surfactants using a chain-terminating group, C, (where B is the silicone and A is polyether) to control molecular weight of the nearly $(AB)_n$ molecule is disclosed DE 198 36 260.

Mechanically frothed polyurethane foam made with silicone surfactants of a certain composition and molecular weight is disclosed in U.S. Pat. No. 4,483,894 wherein the surfactant is a poly(dimethyl)siloxane/polyalkyleneoxide copolymer with greater than 60% by weight of the polyalkyleneoxide being oxyethylene groups that also represents at least 40% of the weight of the entire copolymer, and with the content of dimethylsiloxane from 15-40% by weight of the copolymer. However, the surfactants used in the disclosed process do not provide for low froth density when compared to surfactants of the $(AB)_n$-type and when used in oven cured conditions have associated foam stabilizing problems which results in higher final foam density.

However, there still remains a need in the art for lower polyurethane foam density in mechanically frothed foams with or without the use of chemical blowing assistance from the water/isocyanate reaction. The instant invention provides a solution to this problem.

It would be desirable, in the art of preparing polyurethane foams, to have a polyurethane foam-forming composition that can be mechanically frothed such that a foam having suitable fine cell structure and good properties, including low compression set, can be prepared. It would also be desirable in the art to have a process for preparing polyurethane foam having good physical properties and low density by use of the mechanical froth process.

SUMMARY OF THE INVENTION

In accordance with the present invention, there is provided a polyurethane foam-forming composition which comprises:
  a) at least one polyol possessing a weight average molecular weight from about 500 to about 20,000;
  b) at least one polyisocyanate and/or polythioisocyanate;
  c) at least one polyurethane catalyst;
  d) at least one silicone surfactant that is a polysiloxane/polyoxyalkylene $(AB)_n$-type block copolymer;
  e) at least one silicone surfactant that is a polysiloxane-polyoxyalkylene pendant-type copolymer; and,
  f) optionally, at least one component selected from the group consisting of polymer and/or copolymer, chemical blowing agent, chain extender, crosslinkers, filler, reinforcement, pigments, tints, colorants, flame retardant, antioxidants, thermal or thermal-oxidative degradation inhibitors, UV stabilizers, UV absorbers, antistatic agent, biocide, anti-microbial agent and gas-fade inhibiting agent.

The present invention further provides a process for making a fine-celled polyurethane foam comprising:
  i) mechanically frothing a mixture including the components:
     a) at least one polyol possessing a weight average molecular weight from about 500 to about 20,000;
     b) at least one polyisocyanate and/or polythioisocyanate;
     c) at least one polyurethane catalyst;
     d) at least one silicone surfactant that is a polysiloxane/polyoxyalkylene $(AB)_n$-type block copolymer;
     e) at least one silicone surfactant that is a polysiloxane-polyoxyalkylene pendant-type copolymer; and,
     f) optionally, at least one component selected from the group consisting of polymer and/or copolymer, chemical blowing agent, chain extender, crosslinkers, filler, reinforcement, pigments, tints, colorants, flame retardant, antioxidants, thermal or thermal-oxidative degradation inhibitors, UV stabilizers, UV absorbers, antistatic agent, biocide, anti-microbial agent and gas-fade inhibiting agent; and,
   ii) curing the frothed mixture of (i),
wherein said frothing is performed simultaneously with or subsequent to mixing said components.

The present invention provides a fine-celled polyurethane foam obtained from frothing a polyurethane foam-forming composition having low density imparted from a synergistic combination of polysiloxane/polyoxyalkylene $(AB)_n$-type and polysiloxane-polyoxyalkylene pendant-type surfactants. The produced foam may be more cost efficient due to being lighter in weight because of its decreased density. The process can be used with or without chemical blowing assistance, e.g., from the water/isocyanate reaction or from auxiliary blowing agents.

DETAILED DESCRIPTION OF THE INVENTION

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The present invention may be used for higher density foams to give better "froth stability." The synergistic combination of surfactants allows for better incorporation of a gas, such as, air or nitrogen and better stability of the froth made from this gas.

The fine-celled polyurethane foam obtained from frothing the polyurethane foam-forming composition of the present invention requires suitable polyhydroxyl-terminated materials, i.e., polyols, having 2 to 8 hydroxyl groups per molecule, preferably having 2 to 4 hydroxyl groups, and more preferably 2 to 3 hydroxyl groups per molecule. The polyols preferably have a weight average molecular weight that ranges from 500 to 20,000, and generally more preferably from 1000 to 6000. Included among the useful polyols are polyethers, polyesters and hydroxyl-terminated polyolefin polyols such as the polybutadiene diols. Other useful polyols include copolymers of polymeric materials grafted onto the main polyol chain such as, for example, SAN (styrene/acrylonitrile) or AN (acrylonitrile) grafted onto polyether polyols, commonly referred to as copolymer polyols.

Other suitable polyols include those derived from naturally occurring materials such as castor oil, chemically-modified soybean oil or other chemically-modified fatty acid oils and polyols resulting from polymerization of naturally-occurring or chemically-modified fatty acid oils such as ethoxylated castor oil or ethoxylated soybean oil derived polyol.

The polyurethane foam-forming composition of the present invention can optionally include polyhydroxyl-terminated materials having 2 to 8 hydroxyl groups per molecule and a molecular weight from 62 to 500 that can be referred to as cross-linkers or chain extenders or mixtures thereof. The cross-linkers or chain extenders are present in the foam-forming composition of the invention in an amount that ranges from 0 to 30 parts per 100 parts of the polyhydroxyl-terminated materials that have a molecular weight of over 500, as more fully described herein above. Examples of chain extenders that have 2 hydroxyl groups include but are not limited to dipropylene glycol, tripropylene glycol, diethylene glycol, triethylene glycol, 1,4-butanediol, ethylene glycol, 2,3-butanediol, 2-methyl-1,3-propanediol and neopentylglycol. Examples of cross-linkers that have 3-8 hydroxyl groups include but are not limited to compounds such as glycerine, trimethylolpropane, sorbitol, pentaerythritol and the like. Furthermore, the chain extenders, cross-linkers and polyhydroxyl-terminated materials can also have amino functionality such as, for example, diethanolamine or monoethanolamine and the like.

Suitable organic polyisocyanates or polythioisocyanates useful in the polyurethane foam-forming composition of the present invention are those having an average of 2 to 5 isocyanate or thioisocyanate groups, preferably 2 to 3 isocyanate or thioisocyanate groups and mixtures thereof.

Suitable polyisocyanates include, for example, methanediphenyl diisocyanate or also called methylenebis(phenyl isocyanate), (MDI) including 4-4' and 2-4' and 2-2' isomers and polymeric forms of MDI often referred to as polymeric MDI. Isocyanate prepolymers of MDI made from the reaction of excess MDI with polyols; modified versions of such as uretonimine-modified or allophanate-modified MDI; and combinations in any proportions of MDI variants named above. Another potentially usable polyisocyanate includes toluenediisocyanate (TDI), including 2,4 and 2,6 isomers and isocyanate, prepolymers of TDI made from the reaction of excess TDI with polyols, or other aromatic or aliphatic isocyanates and modified versions including uretonimine-modification, allophanate-modification and prepolymers of these pure and/or modified isocyanates can be used in the invention.

The isocyanate (—NCO) to hydroxyl (—OH) ratio useful in preparing the fine-celled polyurethane foam of the present invention is from about 0.7 to 1.5 and preferably from about 0.8 to 1.2 and more preferably from about 0.9 to 1.1.

Urethane catalyst or combinations of catalysts that can be used in the present invention include organometallic urethane catalysts including, e.g., nickelacetoacetonate, ironacetoacetonate, tin-based catalysts, bismuth-based, titanium-based, zirconium-based, or zinc-based catalysts or combinations of these catalysts. Other catalysts include, alkali metal carboxylates such as potassium octoate, potassium acetate, sodium acetate, or sodium octoate. Also contemplated herein are heavy metal based catalysts such as those based on mercury or lead. Still other catalysts include tertiary amine urethane catalysts, which include, but are not limited to, e.g., triethylenediamine, pentamethyldiethylenetriamine, bis(dimethylaminoethyl)ether. Also included are the blocked versions of tertiary amine catalysts such as those made from tertiary amine catalysts that are reacted carboxylic acids such as formic, acetic, 2-ethylhexanoic, glycolic, lactic, and salicylic. Quaternary ammonium salt catalysts also useful in the foam-forming composition of the present invention include, for example, quarternary ammonium salts of trimethylamine, triethylamine, tetramethylethylenediamine and triethylenediamine and the like.

The synergistic silicone surfactant combination of the invention includes polysiloxane/polyoxyalkylene $(AB)_n$-type block copolymers. The polysiloxane/polyoxyalkylene $(AB)_n$-type block copolymers of the invention include those of two classes: hydrolyzable polysiloxane/polyoxyalkylene $(AB)_n$-type block copolymers, i.e., those wherein the siloxane blocks and the polyoxyalkylene blocks are linked by silicon to oxygen to carbon linkages; and, non-hydrolyzable (hydrolytically stable) polysiloxane/polyoxyalkylene $(AB)_n$-type block copolymers, i.e., those wherein the siloxane blocks and polyoxyalkylene blocks are linked by silicon to carbon linkages.

The polysiloxane/polyoxyalkylene $(AB)_n$-type block copolymers of the invention are substantially linear, however, the possibility of cyclic polysiloxane/polyoxyalkylene $(AB)_n$-type block copolymers exists because in the manufacturing of the $(AB)_n$-type block copolymers the linking of copolymer chains to form ring shaped structures can occur.

Of importance is the preferred use of the polysiloxane/polyoxyalkylene copolymers that are essentially linear due to fact that cyclic versions that have some linked chains could create a material that is extremely high in viscosity and otherwise not practically usable.

The polysiloxane/polyoxyalkylene $(AB)_n$-type block copolymers of this invention are known materials. The polysiloxane/polyoxyalkylene $(AB)_n$-type block copolymers surfactant can be readily obtained, for example, the hydrolyzable $(AB)_n$-type block copolymers of this invention can be prepared by the polycondensation reaction of polyoxyalkylene diols with dialkylamino-terminated dialkylsiloxane fluids thus resulting in a copolymer wherein the polyoxyalkylene blocks and siloxane blocks are linked through an oxygen atom (silicon to oxygen to carbon linkages) and the endblocking groups being selected from the group consisting of hydroxy and/or dialkylamino(dialkyl)siloxy groups which are not preferred. Of course it is to be understood that the linear block copolymers may be "capped" by converting such reactive groups to less reactive groups (e.g. to convert dimethyl amino groups to alkoxy groups) by known methods. Moreover, where a catalyst is used in the production of the linear block copolymer, the block copolymer may be possibly endblocked with a catalyst residue. Endblocking by impurities is also a possibility, e.g. by monofunctional impurities, e.g. monols, which might be present in the materials used to prepare the copolymers of this invention. To the same extent it is understood that the instant copolymers encompass any branching due to trifunctional impurities, e.g. triols.

It will be apparent to those skilled in the art the choice of the particular dimethylamino-terminated siloxane polymer and polyoxyalkylene diol reactant employed merely depends on the particular block copolymer desired. Moreover the final molecular weight of the block copolymer product is also a function of stoichiometry of the reactants, extent or completion of reaction, and possible chain-terminating reactions or reactants. Thus those skilled in the art will readily recognize that it is obvious that an extremely large number and variety of block copolymers can be predetermined and selectively prepared by routine experimentation, which permits tailoring the compositions and products made therefrom to individual specifications and needs rather than vice versa.

The polyoxyalkylene diol which is the other starting material or reactant in the production of the above polysiloxane/polyoxyalkylene $(AB)_n$-type block copolymers include the polyoxyethylene diols, the polyoxypropylene diols, the polyoxybutylene diols, polytetramethyleneglycol (or polytetrahydrofuran)diols as well as mixed oxyalkylene diols, and the like. Said polyoxyalkylene diols as well as methods for their manufacture are well known in the art as witnessed, for example by U.S. Pat. No. 3,480,583, the entire disclosure of which patent is incorporated herein by reference thereto. Said diols are widely available commercially and are conveniently prepared by reacting the corresponding alkylene oxide, or oxides with a diol starter by standard procedures. When more than one alkylene oxide is employed, they can be added to the diol starter sequentially, or they can be first admixed and the admixture added to the diol starter, or they can be added to the diol starter in any other manner. Of course it is to be understood that it is also well known that polyoxyalkylene diols can be made by reacting alkylene oxides with other compounds having labile hydrogen atoms, such as alkyl and aryl dithiols, alkyl and aryl diamines, aryl diols, and the like, e.g., ethylenedithiol, 4,4'dihydroxy-diphenyl propane, and the like. Such polyoxyalkylene diols made from these diverse starting materials also form block copolymers of the same general type with the siloxane polymers and are to be included within the term polyoxyalkylene block as used herein, since the starting fragment of such polyoxyalkylene diol forms an insignificant fraction of the block copolymer.

Other routes for preparing the hydrolyzable polysiloxane/polyoxyalkylene (AB)n-type block copolymers are known in the art, for example, the polycondensation of poly-oxyalkylene diols with halo terminated dihydrocarbyl siloxane fluids in the presence of an acid acceptor or by the polycondensation of polyoxyalkylene diols with hydrogen terminated dihydrocarbyl siloxane fluids in the presence of a suitable catalyst.

The synergistic silicone surfactant combination of the invention includes polysiloxane/polyoxyalkylene $(AB)_n$-type block copolymers having a weight average molecular weight that ranges from 30,000 to 250,000, and preferably from 65,000 to 250,000. According to one embodiment of the invention, the weight average molecular weight of each siloxane block of the $(AB)_n$-type block copolymers ranges from 300 to 10,000, and the weight average molecular weight of each polyalkylene block ranges from 450 to 30,000. Furthermore, the siloxane blocks constitute 20 to 50 weight percent of the total copolymer, while the polyoxyalkylene blocks constitute from 50 to 80 weight percent of the total copolymer.

According to one embodiment of the invention the polysiloxane/polyoxyalkylene $(AB)_n$-type block copolymers are hydrolyzable $(AB)_n$-type silicone surfactants of the general formula:

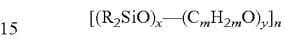

wherein R represents a monovalent hydrocarbon radical free from aliphatic unsaturation and having from 1 to 20 carbon atoms free from aliphatic unsaturation and may include cycloaliphatic groups such as cyclohexyl, cyclooctyl and aryl and alkyl substituted aryl groups having 6 to 20 carbon atoms such as phenyl, tolyl, and xylyl; m can be an integer or integers from 2 to 4 inclusive; x is greater than 4; y is greater than 10; n is greater than 4; and according to one embodiment of the invention the weight average molecular weight of each siloxane block is from about 300 to 10,000, and in another embodiment from about 750 to 2500. In one embodiment of the invention the weight average molecular weight of each polyoxyalkylene block is from about 450 to about 30,000, and in still another embodiment from 1000 to 6000 and in yet another embodiment from 2000 to 4000. The siloxane and polyoxyalkylene blocks are linked by silicon to oxygen to carbon linkages and the siloxane blocks constituting from about 20 to about 50 weight percent of the copolymer, while the polyoxyalkylene blocks constitute about 80 to about 50 weight percent of the copolymer.

According to another embodiment of the invention the polysiloxane/polyoxyalkylene $(AB)_n$-type block copolymers are hydrolyzable $(AB)_n$-type silicone surfactants having been prepared using a slight excess of polyoxyalkylene and are represented by the general formula:

wherein R, x, y, m and n is as previously defined and according to one embodiment of the invention the weight average molecular weight of each siloxane block is from 300 to 10,000, and in another embodiment from 750 to 2500. According to another embodiment of the invention, the weight average molecular weight of each polyoxyalkylene block is from 450 to 30,000, and in another embodiment from 1000 to 6000, and in yet another embodiment from 2000 to 4000. The siloxane and polyoxyalkylene blocks of a non-hydrolyzable $(AB)_n$ are linked by the silicon to oxygen to carbon linkages and the siloxane blocks constituting from about 20 to about 50 weight percent of the copolymer, while the polyoxyalkylene blocks constitute about 80 to about 50 weight percent of the copolymer.

The non-hydrolyzable polysiloxane/polyoxyalkylene $(AB)_n$-type block copolymer silicone surfactants of the invention are known in the art. The non-hydrolyzable polysiloxane/polyoxyalkylene $(AB)_n$-type block copolymers of this invention can be prepared by platinum catalyzed hydrosilation of methallyl (or possibly allyl or vinyl) terminated polyethers with SiH-terminated dialkylsiloxane fluids thus resulting in a copolymer wherein the polyoxyalkylene blocks are linked through silicon to carbon linkages and the endblocking groups being selected from the group consisting of methallyl, propenyl, allyl, vinyl and/or hydrogen (dialkyl)

siloxy groups. Moreover, the non-hydrolyzable polysiloxane/polyoxyalkylene $(AB)_n$-type block copolymers can be prepared by reacting a polyoxyalkylene compound having reactive end groups with a dihydrocarbyl siloxane fluid having end groups reactive with the reactive end groups of the polyoxyalkylene compound. As previously reported the nature of these reactive groups determines the structure of the divalent organic group, the nature of the end blocking groups of the product of course being generally selected from the end groups of the reactants involved.

Of course it is understood that there are many organofunctional siloxanes and functionally-terminated polyethers which are readily apparent to one skilled in the art that may undergo similar reactions to provide the non-hydrolyzable polysiloxane/polyoxyalkylene $(AB)_n$-type block copolymers of the invention.

According to an embodiment of the invention the polysiloxane/polyoxyalkylene $(AB)_n$-type block copolymers are non-hydrolyzable $(AB)_n$-type silicone surfactants having the general structure:

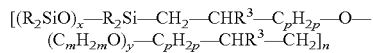

wherein R, x, y, m and n is as previously defined, and p can be an integer or integers from 0 to 4, preferably 1 or methylene group, and $R^3$ represents a monovalent hydrocarbon radical free from aliphatic unsaturation and having from 1 to 20 carbon atoms and may include cycloaliphatic groups such as cyclohexyl, cyclooctyl and aryl and alkyl substituted aryl groups having 6 to 20 carbon atoms such as phenyl, tolyl, and xylyl or hydrogen, preferably a methyl group. According to one embodiment of the invention the weight average molecular weight of each siloxane block is from 300 to 10,000, and in another embodiment from 750 to 2500. In one embodiment the weight average molecular weight of each polyoxyalkylene block is from 450 to 30,000, and in another embodiment from 1000 to 6000 and in yet another embodiment from 2000 to 4000. The siloxane and polyoxyalkylene blocks of a non-hydrolyzable $(AB)_n$ are linked by the silicon to carbon linkages and the siloxane blocks constituting from about 20 to about 50 weight percent of the copolymer, while the polyoxyalkylene blocks constitute about 80 to about 50 weight percent of the copolymer. The block copolymer having a weight average molecular weight that ranges from 30,000 to 250,000, and preferably from 65,000 to 250,000.

In another embodiment of the invention the linear polysiloxane/polyoxyalkylene $(AB)_n$-type block copolymers are non-hydrolyzable $(AB)_n$-type silicone surfactants having been prepared using a slight excess of polyoxyalkylene and are represented by the general formula:

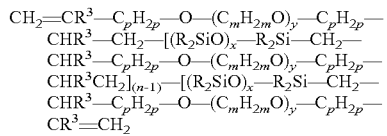

wherein R, x, y, m, n, p and $R^3$ is as previously defined and; and according to one embodiment of the invention the weight average molecular weight of each siloxane block is from 300 to 10,000, and in another embodiment from 750 to 2500. In one embodiment the weight average molecular weight of each polyoxyalkylene block is from 450 to 30,000, and in another embodiment from 1000 to 6000 and in yet another embodiment from 2000 to 4000. The siloxane and polyoxyalkylene blocks of a non-hydrolyzable $(AB)_n$ are linked by the silicon to carbon linkages and the siloxane blocks constituting from about 20 to about 50 weight percent of the copolymer, while the polyoxyalkylene blocks constitute about 80 to about 50 weight percent of the copolymer. The block copolymer having a weight average molecular weight that ranges from 30,000 to 250,000, and preferably from 65,000 to 250,000.

In an embodiment of the invention the polysiloxane/polyoxyalkylene $(AB)_n$-type block copolymers are non-hydrolyzable $D(AB)_nAD$ silicone surfactants having the general structure:

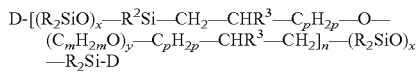

wherein R, $R^3$, x, y, m, n and p are previously defined, and D is $-(C_qH_{2q})-O-(C_mH_{2m}O)_z$-E or $-R$ (note: additional endblocking type); q equals an integer or contains integers from 2 to 6; and z is 0 to 80; E is Hydrogen, or $-R$ or $-(CO)-R$.

The non-hydrolyzable $D(AB)_nAD$ silicone surfactants are known in the art and can be prepared by known and conventional methods, for example, those disclosed in DE 198 36 260, the entire contents of which are incorporated herein by reference.

According to one embodiment of the invention, the hydrolyzable and non-hydrolyzable siloxane/polyoxyalkylene $(AB)_n$-type block copolymers are employed in the foam-forming composition of the invention in an amount that ranges from 0.5 to 8 parts per 100 parts polyol by weight of the foam-forming composition and preferably in an amount that ranges from 1.0 to 4 parts per 100 parts polyol of the foam-forming composition.

The synergistic combination of silicone surfactants of the invention includes those silicone surfactants that are hydrolyzable and/or non-hydrolyzable polysiloxane-polyoxyalkylene pendant-type copolymer.

Procedures for synthesizing hydrolyzable and non-hydrolyzable polyoxyalkylene pendant-type copolymer surfactants are well known. For example, procedures for synthesizing non-hydrolyzable silicone surfactants having polyether pendant groups are disclosed in U.S. Pat. Nos. 4,147,847 and; 4,855,379 which are hereby incorporated by reference.

In one embodiment, hydrolyzable pendant-type copolymer can be made from the "transesterification" reaction of monol polyether with a siloxane having at least one alkoxy group on the silicon atoms on the siloxane backbone. This siloxane backbone may be linear or branched with terminal and/or mid-chain alkoxy groups. Typical alkoxy groups are methoxy or ethoxy. The monol polyether is made from a monol alcohol starter that is alkoxylated. Thus one end of this monol polyether is terminated with a hydroxyl group and the opposite end is capped by an oxyalkyl group. The hydroxyl end of this monol polyol attaches to the silicon during the tranesterification reaction. Thus the copolymer made is hydrolysable and the polyether pendants are connected to the siloxane backbone by silicon to oxygen to carbon linkages. The typical monol alcohol starter used to make the monol polyether is methanol or n-butanol thus the polyether pendants on this hydrolyzable pendant-type copolymer is often endcapped by either oxybutyl or oxymethyl groups.

In one embodiment, non-hydrolyzable pendant-type copolymers can be made from the hydrosilation reaction of linear or branched siloxanes having hydrogen groups on the silicons of the siloxane backbone. The polyether used to make these copolymers has one terminal end having aliphatic unsaturation to unable the connection of the polyether to the siloxane backbone through the hydrosilation reaction. Often the aliphatic unsaturation on these polyethers used to make these copolymers is typically from an allyl group but methallyl or vinyl groups have also been used. It is also possible to use other forms of aliphatic unsaturation to attach polyether pendants onto a siloxane backbone through hydrosilation. The hydrosilation reaction is often carried out using platinum hydrosilation catalysts but it is also possible to use any other catalyst that promotes the hydrosilation reaction. The polyethers used to make these non-hydrolyzable copolymers, besides having aliphatic unsaturation on one terminal end, may on the other terminal end have a hydroxyl group or may be capped to have a terminal alkoxy or alkylcarboxy group. Typical capped polyether endgroups are most often methoxy or acetoxy groups.

According to an embodiment of the invention, the hydrolyzable and/or non-hydrolyzable polysiloxane-polyoxyalkylene pendant-type copolymer have weight average molecular weight less than about 30,000 and consists of about 15 to about 55 percent by weight siloxane. The polyoxyalkylene portion has greater than about 50 percent by weight of oxyethylene groups. The total silicone surfactant (i.e., polysiloxane-polyoxyalkylene pendant-type copolymer) must also contain greater than about 40 percent by weight of oxyethylene groups.

The non-hydrolyzable polysiloxane-polyoxyalkylene pendant-type copolymer consists of repeating siloxane units described by the general structure:

$$R_a F_b SiO_{(4-a-b)/2}$$

wherein the organosiloxane of the above formula can contain any combination of siloxane units selected from the group consisting of $R_3SiO_{1/2}$, $R_2FSiO_{1/2}$, $R_2SiO_{2/2}$, $RFSiO_{2/2}$, $RSiO_{3/2}$, $FSiO_{3/2}$ and $SiO_{4/2}$; and wherein R represents a monovalent hydrocarbon group free of aliphatic unsaturation having 1 to 20 carbon atoms, such as methyl, ethyl, propyl, butyl, decyl and cycloaliphatic groups such as cyclohexyl, cyclooctyl and aryl and alkyl substituted aryl groups having 6 to 20 carbon atoms such as phenyl, tolyl, and xylyl. Typically R is a methyl group. The subscript a has an average value over all siloxane units from 1 to 2.9 and the subscript b has an average value over all siloxane units from 0.1 to 1 and the sum of subscripts a and b has an average value over all siloxane units of 1.5 to 3.0. F is the polyoxyalkylene pendant-portion of the non-hydrolysable polysiloxane-polyoxyalkylene pendant-type copolymer having the formula, $$-(C_qH_{2q})-O-(C_mH_{2m}O)_r-H; \text{ or}$$

$$-(C_qH_{2q})-O-(C_mH_{2m}O)_r-R^2; \text{ or}$$

$$-(C_qH_{2q})-O-(C_mH_{2m}O)_r-CO-R^2$$

where m equals an integer or mixtures of integers from 2 to 4, q equals an integer from 2 to 6 or mixtures of integers from 2 to 6, and r is greater than 1. $R^2$ represents a monovalent hydrocarbon group free of aliphatic unsaturation having 1 to 20 carbon atoms, such as methyl, ethyl, propyl, butyl, decyl and cycloaliphatic groups such as cyclohexyl, cyclooctyl and aryl and alkyl substituted aryl groups having 6 to 20 carbon atoms such as phenyl, tolyl, and xylyl. Typically $R^2$ for non-hydrolyzable polysiloxane-polyoxyalkylene pendant-type copolymers is a methyl group.

The hydrolyzable polysiloxane-polyoxyalkylene pendant-type copolymer consists of repeating siloxane units described by the general structure $$R_a G_b SiO_{(4-a-b)/2}$$

wherein R represents a monovalent hydrocarbon group free of aliphatic unsaturation having 1 to 20 carbon atoms, the subscript a has an average value over all siloxane units from 1 to 2.9, the subscript b has an average value over all siloxane units over all siloxane units from 0.1 to 1, and the sum of subscripts a and b has an average value over all siloxane units from 1.5 to 3.0, G is the polyoxyalkylene having the formula:

$$-O-(C_mH_{2m}O)_r-R^2$$

where m equals an integer or mixtures of integers from 2 to 4, r is greater than 1, $R^2$ is a monovalent hydrocarbon group free of aliphatic unsaturation having 1 to 20 carbon atoms and the siloxane unit is at least one selected from the group consisting of $R_3SiO_{1/2}$, $R_2GSiO_{1/2}$, $R_2SiO_{2/2}$, $RGSiO_{2/2}$, $RSiO_{3/2}$, $GSiO_{3/2}$ and $SiO_{4/2}$. $R_2$ represents a monovalent hydrocarbon group free of aliphatic unsaturation having 1 to 20 carbon atoms, such as methyl, ethyl, propyl, butyl, decyl and cycloaliphatic groups such as cyclohexyl, cyclooctyl and aryl and alkyl substituted aryl groups having 6 to 20 carbon atoms such as phenyl, tolyl, and xylyl. Typically $R^2$ for hydrolysable polysiloxane-polyoxyalkylene pendant-type copolymers is a methyl or butyl group.

According to one embodiment of the invention the non-hydrolyzable and hydrolysable pendant-type siloxane-oxyalkylene surfactants are employed in the foam-forming composition of the invention in an amount that ranges from 0.1 to 4.0 parts per 100 parts polyol of the foam-forming composition of the invention, and preferably in an amount that ranges from 0.5 to 2.0 parts per 100 parts of the polyol of the foam-forming composition.

Although the polyurethane foam of the present invention is provided by mechanical frothing or whipping of the foam-forming composition, according to an embodiment of the invention, a blowing agent can be added to the composition. Suitable blowing agents are well known in the art. Within the blowing agents, particularly useful are chemical blowing agents, e.g., water and formic acid. Blowing agents that are reactive with isocyanate and create gas upon reaction with isocyanate and includes compounds, such as, water, in an amount form 0 to 3 parts based on the 100 parts of the polyol material; and, formic acid, in an amount from 0 to 2 parts based on the 100 parts of the polyol material.

Other optional auxiliary blowing agents may be chemicals that volatilize or decompose giving a volatile gas due to heat. One embodiment of the use of such a blowing agent is one that would create a volatile gas during the cure of the foam by heat in an oven or other external heat-induced curing process. This additional blowing agent would be used to reduce foam density beyond that obtained by mechanically frothing and/or chemically blowing with isocyanate-reactive blowing agents.

Other optional ingredients include fillers, e.g., inorganic fillers or combinations of fillers in amounts know in the art. Fillers may include those for density modification, physical property improvements such as mechanical properties or sound absorption, fire retardancy or other benefits including those that may involve improved economics such as, for example, calcium carbonate or other fillers that reduce the cost of manufactured foam, aluminum trihydrate or other fire retardant fillers, barium sulfate or other high-density filler that is used for sound absorption, microspheres of materials such as glass or polymers that may also further reduce foam density. Fillers of high aspect ratio that are used to modify mechanical properties such as foam hardness or stiffness or flexural modulus that would include: man-made fibers such as milled glass fiber or graphite fiber; natural mineral fibers such as wollastonite; natural animal fibers such as wool or plant fibers such as cotton; man-made plate-like fillers such as shattered glass; natural mineral plate-like fillers such as mica; fiber reinforcement from a list including man-made fibers such as milled glass fiber, or graphite fiber, natural mineral fibers such as wollastonite, natural animal fibers such as wool, and/or natural plant fibers such as cotton, and/or plate-like reinforcements including man-made plate-like fillers such as shattered glass and/or natural mineral plate-like fillers such as mica. The invention includes the possible addition of any pigments, tints or colorants. Additionally, the invention contemplates the use of organic flame or fire retardants; antioxidants; thermal or thermal-oxidative degradation inhibitors, UV stabilizers, UV absorbers or any other additives that would added to prevent thermal, light, and/or chemical degradation. Also the possible addition of any anti-stat agents; anti-microbial agents; and gas-fade inhibiting agents.

It is well known in the art that the mechanical frothing operation of the polyurethane forming composition is performed in high shear mixing equipment such as an Oakes mixer or Firestone mixer and similar known equipment. According to one embodiment of the invention, the fine-celled polyurethane foam is prepared by a process utilizing high-shear mixing of the polyurethane foam-forming composition components herein to make mechanically frothed foam. Wherein some of the components may be premixed into a pre-blend in a batch mixing process prior to addition of other components at the high-shear mixer. Further, the components may be premixed using a low shear mixer prior to entering a high shear mixer or mixing process. Furthermore, some components may be added into the high shear mixing process or mixer at the same location as other components enter in the mixhead or in locations within in the mixer that represent various degrees of completion of the mixing process. The frothed polyurethane foam of the present invention is cured (i.e. completing the urethane and possibly urea reactions) by known and conventional means.

Gas such as air, nitrogen, carbon dioxide can be injected into the mixing of components or entrained through capture from above the surface of mixed components. The gas can also be injected into the high-shear mixer through pressure. Mixers include the aforementioned or other similar equipment that produce high shear conditions during mixing.

The following examples are illustrative of the present invention but are not to be construed as to limiting the scope thereof in any manner.

EXAMPLES

Standard Mechanically Frothed Foam Formulation

To test the ability of individual and combinations (i.e., mixtures) of surfactants to lower froth density, a standard mechanically frothed foam system was used. This formulation is displayed in Table 1 below.

TABLE 1

Experimental Mechanically Frothed Foam Formation

| Resin Blend Components | Material type | OH # (equivalent) | Parts of component, per 100 parts polyol, php |
|---|---|---|---|
| Arcol 11-34 | Polyether polyol | 34 | 70 |
| Arcol 24-32 | Polymer polyol SAN grafted polyether | 32 | 30 |
| Dipropylene glycol | Chain-extender | 836 | 15 |

TABLE 1-continued

Experimental Mechanically Frothed Foam Formation

| Water | Chemical blowing agent | (6228) | 0 (for no chemical co-blowing) or 2 (for co-blown chemically) |
|---|---|---|---|

| Additives to Resin Blend | | | Parts of component per 100 parts of Resin Blend |
|---|---|---|---|
| Froth Surfactant** | $(AB)_n$-type block copolymer of polydimethylsiloxane/polyether | 34 for Surfactant A 84 for Surfactant B | 2 php Surfactant A; 4 php Surfactant B |
| Co-surfactant** | Pendant-type copolymer of polydimethylsiloxane/polyether | Different for each surfactant | 2 php without any $(AB)_n$ surfactant; 1 php with $(AB)_n$ surfactant |
| Niax Catalyst LC-5615 | 10% Nickelacetoacetonate dissolved in polyether polyol | 51 | 2 |

| Isocyanate Component | | % NCO | Isocyanate Index* |
|---|---|---|---|
| Isonate 143L | Uretonimine-modified MDI Isocyanate | 29.3 | 107 for Design Set 1 103.5 for Design Set 2 |

*Isocyanate Index is the ratio of moles of isocyanate groups to that of moles of isocyanate-reactive groups (such as hydroxyl) multiplied by 100. Thus, a 107 index represents 7% molar excess of isocyanate and a 103.5 index represents a 3.5% molar excess of isocyanate.
**Subject of invention.

Table 2 displays mechanical froth surfactants that are polysiloxane-polyoxyalkylene $(AB)_n$-type, block copolymer: $(AB)_n$-type Siloxane/Oxyalkylene (Dimethylsiloxane/Polyether[1]) Block Copolymers. (Surfactants Typically Used in Mechanically Frothed Foam Applications)

TABLE 2

| | | Copolymer | | |
|---|---|---|---|---|
| Surfactant | Hydrolyzable | Molecular Weight | % $DMS^2$ | % $EO^3$ |
| A | Yes | 70000-120000 | 31-32 | 33-35 |
| B | No | 80000-130000 | 31-32 | 33-35 |

[1]Polyether has random oxyethylene and oxypropylene groups
[2]% DMS is the percentage of dimethylsiloxane in surfactant copolymer
[3]% EO is the percentage of total copolymer that is oxyethylene groups Tables 3 displays pendant-type silicone copolymer surfactants: Non-Hydrolyzable Siloxane/oxyalkylene (Dimethylsiloxane/Polyether[1]) Copolymers.

TABLE 3

| | Surfactant Copolymer | | | | Polyether pendant | |
|---|---|---|---|---|---|---|
| Surfactant | Molecular Weight (average) | % $DMS^2$ | % $EO^3$ | OH # | % $EO^4$ | Molecular Weight (average) |
| C | 22800 | 24 | 30 | 20 | 40 | 2300 |
| D | 17200 | 34 | 26 | 3 | 40[5] | 2200 |
| E** | 14000 | 27 | 54 | 8 | 75[5] | 1500 |
| F** | 8900 | 42 | 43 | 57 | 75 | 750 |
| G** | 9300 | 31 | 52 | 40 | 75 | 750 |

TABLE 3-continued

| | Surfactant Copolymer | | | | Polyether pendant | |
|---|---|---|---|---|---|---|
| Surfactant | Molecular Weight (average) | % DMS[2] | % EO[3] | OH # | % EO[4] | Molecular Weight (average) |
| H** | 4500 | 32 | 67 | 75 | 100 | 550 |
| I** | 5600 | 26 | 73 | 8 | 100[5] | 750 |
| J** | 11000 | 49 | 50 | 43 | 75 | 750 |

[1] Polyether may contain random oxyethylene and oxypropylene groups or all oxyethylene groups
[2] % DMS is the percentage of dimethylsiloxane in copolymer
[3] % EO is the percentage of total copolymer in which the polyether portion that contains oxyethylene groups
[4] % EO is the percentage of polyether pendant that contains oxyethylene groups
[5] polyether pendant is oxymethyl-terminated
**Subject of invention Making Master Resin Blend for Each Example Design Set Master resin blends were made for each of the following Example design sets. Prior to each foaming Example, resin material was taken from the master blend and the other additive components (i.e., surfactant(s) and catalyst) were added prior to or during the mechanical frothing of the system.

Master Resin Blend for Mechanically Frothed Foam with No Chemical Blowing.

To test the performance of individual surfactants and surfactant combination in a totally mechanically frothed foam formulation (with no chemical co-blowing), no water was added in the above formulation. This resin blend was made from the above formulation by adding the first two polyols, Arcol 11-34 and Arcol 24-32, and dipropylene glycol into one-gallon glass container (jug) and mixing into a single master batch of resin (typically 3450 g. batch of 2100 g. of Arcol 11-34, 900 g. of Arcol 24-32, and 450 g. of dipropylene glycol). This formulation was used in Examples 1-18. The mixing of the master resin blends described above was accomplished by: pouring all the described components into a one gallon glass jug, sealing the jug with a cap, putting the glass jug onto a glass jar or jug roller and rolling at "medium speed" for approximately two hours. Under these mixing conditions it assures that a homogeneous mixture of components is made and also additional water absorption from the atmospheric moisture is avoided by mixing these components within a closed container.

Master Resin Blend for Mechanically Frothed Foam with Chemical (Water) Blowing.

To test the performance of individual surfactants and surfactant combination in a partially water-blown (or partially chemically blown) formulation, water was added in the above formulation initially with polyols to the resin master batch (60 g of water added to the above 3450 g batch). This formulation was used in Examples 19-25 [the second design set of experiments-remove]. The mixing of these components followed the same procedure as the above batch.

Making Mechanically Frothed Foams by Handmix Method

Method Used for Examples 1-18 of Mechanically Frothed Foams

A 4-quart stainless steel mixing bowl from a KitchenAid KSM-90 mixer is placed on a bench top scale and the scaled is tared to read zero. 300 g of the blended master resin batch without added water were poured into the 4-quart stainless steel mix bowl. To this master resin blend the test surfactant(s) and the urethane catalyst, Niax Catalyst LC-5615, were then added into the mixing bowl. The bowl was then put onto the KitchenAid mixer and the ingredients were mixed at the lowest speed setting (1) for 2 minutes using the whisk mixing attachment. The mixer was then stopped and the isocyanate was added in an amount that gave an isocyanate index value of 107. The weight of isocyanate added was adjusted, for each foam made, due to the different hydroxyl content of the surfactant(s) used but ranged from 115.6 to 118.9 g. The mixer speed was then turned up to the highest setting (10) and mixing was allowed to continue for 10 minutes. After this mixing was completed, some of the frothed mixture was quickly poured into a 250 ml plastic disposable beaker until the foam was slightly above the top of the cup. The beaker with foam was then tapped down for about 10 seconds onto the laboratory bench to allow larger trapped air bubbles to rise out of the foam and then the foam was scraped off the top of beaker such that the upper surface of the froth was flush with that of the top of the beaker. With a known volume of the beaker, the weight of the foam in the beaker was measured and the froth density of the foam was calculated (from the foam weight divided by the volume of the beaker). Most of the remaining frothed foam was poured into waxed, 9" by 9" Teflon-coated backing pan and then put into an oven set at 130° C. for 40 minutes to cure. The foam was then removed from the oven and cell structure, shrinkage and/or expansion of the foam during oven cure (indicating the foam stability) was noted.

Method Used for Examples 19-25 of Mechanically Frothed Foams

A 4-quart stainless steel mixing bowl from a KitchenAid KSM-90 mixer is placed on a bench top scale and the scaled is tared to read zero. 300 g of the blended master resin batch with water added were poured into the 4-quart stainless steel mix bowl. To this master resin blend, the test surfactants were added into the mixing bowl. The bowl was then put onto the KitchenAid mixer and mixed at the lower speed setting (1) for 2 minutes using the whisk mixing attachment. The mixer was then stopped and the isocyanate was added in an amount that gave an isocyanate index value of 103. (n.b. lower index was adopted because the added water gave a much higher apparent hydroxyl content to the reaction mixture and lesser isocyanate index was used than that for making Examples 1-18 foams)

The weight of isocyanate added was adjusted for Examples 19-25 due to the different hydroxyl content of the surfactant(s) used but ranged from 199.8 to 208.8 g. The mixer speed was then turned up to the highest setting (10) and mixing was allowed to continue for 10 minutes. At 8 minutes into this final 10 minute mix (or 2 minutes before the finish of the final mix), the urethane catalyst, Niax Catalyst LC-5615 was added.

After this mixing was completed, the froth density of Examples 19-25 was measured using the same procedure used in Examples 1-18. The remaining frothed foam was poured into waxed, 9" by 9" Teflon-coated backing pan and then put into an oven set at 130° C. for 40 minutes to cure. The foam was then removed from the oven and cell structure, shrinkage and expansion of the foam during oven cure (indicating the foam stability) was noted.

Table 4 presents data comparing Comparative Examples (Comp. Ex.) 1-7 (i.e., Froth Densities of a Mechanically Frothed Foam Made from Single Surfactant) and Examples 8-18 (i.e., Combined Surfactants).

TABLE 4

| Label each as Ex and Comp | (AB)$_n$-type Surfactant Used in Mechanically Frothed Foam | | Pendant-type Co-surfactant | | Froth Density, | Rise Height of Mechanically Frothed |
|---|---|---|---|---|---|---|
| Ex | Surfactant | phr* | Surfactant | phr* | pcf** | Foam During Oven Cure |
| Comp. Ex 1 | A | 2 | None | 0 | 19.4 | High, normal and stable |
| Comp. Ex 2 | B | 4 | None | 0 | 18.7 | High, normal and stable |
| Comp. Ex 3 | None | 0 | C | 2 | 19.5 | High, normal and stable |
| Comp. Ex 4 | None | 0 | D | 2 | 21.7 | Moderately high, stable |
| Comp. Ex 5 | None | 0 | G | 2 | 21.2 | Low, not stable |
| Comp. Ex 6 | None | 0 | E | 2 | 23.9 | Low, not stable |
| Comp. Ex 7 | None | 0 | F | 2 | 24.4 | Low, not stable |
| Example 8 | A | 2 | C | 1 | 20.6 | Moderate, semi-stable |
| Example 9 | B | 4 | C | 1 | 20.3 | Moderate, semi-stable |
| Example 10 | A | 2 | D | 1 | 21.5 | Moderate, semi-stable |
| Example 11 | B | 4 | D | 1 | 20.6 | Moderate, semi-stable |
| Example 12*** | A | 2 | G | 1 | 18.9 | High, normal and stable |
| Example 13*** | B | 4 | G | 1 | 17.7 | High, normal and stable |
| Example 14*** | A | 2 | E | 1 | 18.6 | High, very stable |
| Example 15*** | B | 4 | E | 1 | 17.6 | High, very stable |
| Example 16*** | A | 2 | F | 1 | 17.9 | High, very stable |
| Example 17*** | B | 4 | F | 1 | 16.7 | High, very stable |
| Example 18*** | A | 2 | J | 1 | 18.6 | Moderately high, stable |

*phr is parts per hundred of master resin blend
**pcf is pounds (mass) per cubic foot
***subject of the invention Table 4 presents data of individual and combined silicone surfactants on the froth density of mechanically frothed foam that is not co-blown chemically with water. Comparative Examples 1 and 2 display the froth density of mechanically frothed foam using only Surfactant A or Surfactant B, respectively. The use of Surfactant B is twice as much as that of Surfactant A because it is relatively half as potent as Surfactant A due to the (AB)$_n$ copolymer content of each representative surfactant.

Comparative Examples 3-7 (which contain various types of non-hydrolyzable pendant-type siloxane/oxyalkylene copolymer surfactants) were prepared with surfactant levels of 2 phr with the majority of the surfactant being active copolymer (with the exception of the excess polyether reactant that exists at 10-30% in these non-hydrolyzable pendant-type surfactants). Thus, the active silicone copolymer for all of foams was significantly greater than 1 phr and less than 2 phr. None of the foams of Comparative Examples 3-7, made using a pendant-type surfactant alone, had froth densities lower than the foams made in Comparative Examples 1 and 2, which used an (AB)$_n$-type surfactant alone indicating that the (AB)$_n$-type surfactants alone are better than pendant-type alone. Comparative Examples 3 and 4 were foams made using a single pendant-type surfactant having lower percentage of oxyethylene groups than that claimed in this invention. Comparative Examples 5-7 were foams made using a single pendant-type surfactant with the percentage of oxyethylene groups within that claimed in this invention. It should be noted that the froth density was lower and the foams made were more stable using the single pendent surfactants in comparative examples 3 and 4 than those used in Comparative Examples 5-7. Thus from this result, it would suggest that the surfactants used in Comparative Examples 3 and 4 are more stabilizing than those used in Comparative Examples 5-7. One working in this art might initially believe that the pendant-type surfactants used in Comparative Examples 3 and 4 might improve the froth stability of mechanically frothed foam when used with (AB)$_n$-type surfactants better than the pendant-type surfactants used in Comparative Examples 5-7, but as will be shown as follows, the opposite or unexpected result is true.

Examples 8 through 18 were mechanically frothed foams prepared with combinations of (AB)$_n$-type silicone surfactants and pendant-type surfactants. The use level of the pendant-type surfactant was reduced to 1 phr to be closer to the activity or copolymer content of the (AB)$_n$-type copolymer surfactants.

Examples 8-11 present data showing mechanically frothed foams made using the combination of an (AB)$_n$-type surfactant and a pendant-type surfactant having lower percentage of oxyethylene groups than that of the claims of this invention had higher froth density than that of the comparable foams made using only the (AB)$_n$-type surfactant alone (i.e., Comparative Examples 1 and 2). Thus, this combination of surfactants had a negative or anti-synergistic effect on froth density (making it higher than using the (AB)$_n$-type of surfactant alone).

The data from Examples 12-18 (i.e., mechanically frothed foams made using the synergistic combination of an (AB)$_n$-type and a pendant-type surfactants, having a percentage of oxyethylene within the claims of invention) displayed lower froth density than that of the comparable foams made using only the (AB)$_n$-type surfactant alone (i.e., Comparative Examples 1 and 2) or with foams made using the same pendant-type surfactant alone (i.e., Comparative Examples 5-7). Thus, the inventive combination of surfactants had a synergistic effect on froth density (i.e., lower than that using the (AB)$_n$-type of surfactant alone).

Data representing the synergistic effect of the inventive combination mixture of (AB)$_n$-type and pendant-type surfactants having a percentage of oxyethylene groups within the claims of the invention in partially water-blown (or chemically-blown) systems are presented in the foams of Examples 20-25 which were prepared from master resin batch system that contained 2 php (parts per hundred parts of polyol) of water.

Table 5 displays the froth density of the foam of Comparative Example 19 which was prepared with Surfactant A, an $(AB)_n$-type surfactant alone, and the froth density of the foams of Examples 20-25 that were prepared with Surfactant A or B, an $(AB)_n$-type surfactant, in combination with a pendant-type surfactant that contains a percentage of oxyethylene groups within the claims of the invention. For the partially water-blown mechanically frothed system, the data in Table 5 displays a synergistic effect of lowering the froth density when the combination of an $(AB)_n$-type surfactant is used with pendant-type surfactants that contain a percentage of oxyethylene groups within the claims of the invention. These foams had a very high rise-of-height which can be attributed to the stability of the surfactant combination as well as to the water blowing reaction from the added water in this system.

Table 5 displays the Froth Densities of Partially Water-blown Mechanically Frothed Foams Made Using an $(AB)_n$-type Surfactant or with a Combination of an $(AB)_n$-type and Pendant-type Surfactants (containing relatively high content of oxyethylene groups).

TABLE 5

| | $(AB)_n$-type Surfactant Used in Mechanically Frothed Foam | | Pendant-type Co-surfactant | | Froth Density, | Rise Height of Mechanically Frothed Foam During Oven |
|---|---|---|---|---|---|---|
| | Surfactant | phr* | Surfactant | phr* | pcf** | Cure |
| Comp Ex 19 | A | 2 | None | 0 | 20.9 | Very High, Stable |
| Example 20*** | A | 2 | F | 1 | 18.9 | Very High, Stable |
| Example 21*** | B | 4 | F | 1 | 18.1 | Very High, Stable |
| Example 22*** | A | 2 | G | 1 | 17.0 | Very High, Stable |
| Example 23*** | A | 2 | H | 1 | 16.8 | Very High, Stable |
| Example 24*** | A | 2 | I | 1 | 17.1 | Very High, Stable |
| Example 25*** | B | 4 | I | 1 | 16.2 | Very High, Stable |

*phr is parts per hundred of master resin blend
**pcf is pounds (mass) per cubic foot
***subject of the invention While the invention has been described with reference to a preferred embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

The invention claimed is:

1. A polyurethane foam-forming composition which comprises:
   a) at least one polyol possessing a weight average molecular weight from about 500 to about 20,000;
   b) at least one polyisocyanate and/or polythioisocyanate;
   c) at least one polyurethane catalyst;
   d) at least one polysiloxane/polyoxyalkylene $(AB)_n$-type block silicone surfactant copolymer in an amount of from 0.5 to 8 parts based on 100 parts of the polyol (a), wherein the copolymer (d) is selected from the group consisting of hydrolyzable $(AB)_n$-type block silicone surfactant copolymers having the general structures:

$[(R_2SiO)_x\text{—}(C_mH_{2m}O)_y]_n$; and $HO\text{—}(C_mH_{2m}O)_y\text{—}[(R_2SiO)_x\text{—}(C_mH_{2m}O)_y]_n\text{—}H$ wherein each occurrence of R is methyl; x is greater than 4; m equals an integer or a mixture of integers from 2 to 4; y is greater than 10; and n is greater than 4, and with the provisos that
   (i) the hydrolyzable $(AB)_n$-type block silicone surfactant copolymer has a weight average molecular weight of from 65,000 to 250,000;
   (ii) each siloxane block of the hydrolyzable $(AB)_n$-type block silicone surfactant copolymer has a weight average molecular weight of from 300 to 10,000;
   (iii) each polyoxyalkylene block of the hydrolyzable $(AB)_n$-type block silicone surfactant copolymer has a weight average molecular weight of from 2,000 to 4,000; and
   (iv) the siloxane blocks constitute from 20 to 50 weight percent of said copolymer and the polyoxyalkylene blocks constitute 80 to 50 weight percent of said copolymer;
   e) at least one non-hydrolyzable polysiloxane-polyoxyalkylene pendant-type silicone surfactant copolymer in an amount of from 0.1 to 4 parts based on 100 parts of the polyol (a), wherein the copolymer (e) comprises repeating siloxane units having the general structure:

$R_aF_bSiO_{(4-a-b)/2}$ wherein R is methyl; a has an average value over all siloxane units from 1 to 2.9; b has an average value over all siloxane units from 0.1 to 1; each F is a polyoxyalkylene having the formula:

$\text{—}(C_qH_{2q})\text{—}O\text{—}(C_mH_{2m}O)_r\text{—}H$ or $\text{—}(C_qH_{2q})\text{—}O\text{—}(C_mH_{2m}O)_r\text{—}R^2$ or $\text{—}(C_qH_{2q})\text{—}O\text{—}(C_mH_{2m}O)_r\text{—}(CO)\text{—}R^2$ where each m is independently an integer of from 2 to 4; each q is independently an integer from 2 to 6; r is greater than 1; and $R^2$ is methyl, and with the provisos that
   (i) the non-hydrolyzable pendant-type copolymer has a weight average molecular weight of from 4,500 to 14,000;
   (ii) the siloxane blocks of the non-hydrolyzable pendant-type copolymer constitute of from 26 to 49 weight percent of the copolymer,
   (iii) each polyoxyalkylene block of the non-hydrolyzable pendant-type copolymer has a weight average molecular weight of from 550 to 1,500, and contains from 75 to 100 weight percent oxyethylene groups; and (iv) the sum of a and b has an average value over all siloxane units from 1.5 to 3.0; and, f) optionally, at least one component selected from the group consisting of polymer and/or copolymer, blowing agent, chain extender, crosslinkers, filler, reinforcement, pigments, tints, colorants, flame retardant, antioxidants, thermal or thermal-oxidative degradation inhibitors, UV stabilizers, ITV absorbers, anti-static agent, biocide, anti-microbial agent and gas-fade inhibiting agent.

2. The composition of claim 1 wherein the polyol component (a) is at least one selected from the group consisting of polyether polyol, polyester polyol, polycaprolactone polyol, polycarbonate polyol, polybutadiene polyol, hydroxyl-terminated polyolefin polyols, graphed polyol and polyols derived from a natural source.

3. The composition of claim 2 wherein the grafted polyol component (a) is at least one selected from the group consisting of styrene/acrylonitrile (SAN) graphed polyether polyol, acrylonitrile (AN)-graphed polyether polyol and graphed polyester polyols.

4. The composition of claim 2 wherein the polyol component (a) is at least one selected from the group consisting of polyether-terminated polybutadiene and polyether-terminated polyols derived from a natural source.

5. The composition of claim 1 wherein the polyol component (a) has 2 to 8 hydroxyl groups per molecule.

6. The composition of claim 5 wherein the polyol component (a) has 2 to 4 hydroxyl groups per molecule.

7. The composition of claim 6 wherein the polyol component (a) has 2 to 3 hydroxyl groups per molecule.

8. The composition of claim 1 wherein the polyisocyanate and/or polythioisocyanate component (b) have an average of 2 to 5 isocyanate or thioisocyanate groups.

9. The composition of claim 8 wherein the polyisocyanate and/or polythioisocyanate component (b) have an average of 2 to 3 isocyanate or thioisocyanate groups.

10. The composition of claim 1 wherein component (b) is at least one selected from the group consisting of methanediphenyl diisocyanate (MDI), polymeric MDI, modified MDI, prepolymers of MDI, toluenediisocyanate (TDI), prepolymers of TDI and modified TDI.

11. The composition of claim 10 wherein component (b) is at least one selected from the group consisting of 4,4' methanediphenyl diisocyanate, 2,4' methanediphenyl diisocyanate, 2,2' methanediphenyl diisocyanate, 2,4-toluenediisocyanate, and 2,6-toluene diisocyanate.

12. The composition of claim 1 wherein component (b) is an uretonimine-modified and/or allophanate-modified polyisocyanate.

13. The composition of claim 1 wherein the polyurethane catalyst, component (c), is at least one selected from the group consisting of organometallic catalysts, tertiary amine catalysts and quaternary ammonium catalysts.

14. The composition of claim 13 wherein the organometallic catalyst is at least one selected from the group consisting of nickelacetoacetonate, ironacetoacetonate, tin-based catalysts, bismuth-based catalysts, zinc-based catalysts, titanium-based catalysts, alkali metal carboxylates and heavy metal based catalyst.

15. The composition of claim 14 wherein the alkali metal carboxylate catalyst is at least one selected from the group consisting of potassium octoate, potassium acetate, sodium acetate and sodium octoate.

16. The composition of claim 14 wherein the heavy metal based catalysts is at least one selected from the group consisting of mercury-based and lead-based catalysts.

17. The composition of claim 1 wherein the polysiloxane/polyoxyalkylene (AB)$_n$-type block copolymer component (d) is a hydrolyzable (AB)$_n$-type silicone surfactant having the general structure:

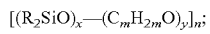

wherein each occurrence of R is methyl, and x is greater than 4, m equals an integer or a mixture of integers from 2 to 4, y is greater than 10, n is greater than 4.

18. The composition of claim 1 wherein the polysiloxane/polyoxyalkylene (AB)$_n$-type block copolymer component (d) is a hydrolyzable (AB)$_n$-type silicone surfactant having the general structure:

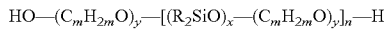

wherein each occurrence of R is methyl, and x is greater than 4, m equals an integer or a mixture of integers from 2 to 4, y is greater than 10, n is greater than 4.

19. The composition of claim 1 wherein each siloxane block of the hydrolyzable (AB)$_n$-type block silicone surfactant copolymer has a weight average molecular weight from 750 to 2500.

20. The composition of claim 1 wherein the polysiloxane/polyoxyalkylene (AB)$_n$-type block copolymer component (d) is present in an amount from 1.0 to 4 parts based on the 100 parts of the polyol, component (a).

21. The composition of claim 1 wherein the polysiloxane-polyoxyalkylene pendant-type copolymer component (e) is a non-hydrolyzable polysiloxane-polyoxyalkylene pendant-type copolymer comprising repeating siloxane units selected from the group consisting of $R_3SiO_{1,2}$, $R_2FSiO_{1/2}$, $R_2SiO_{2/2}$, $RFSiO_{2/2}$, $RSiO_{3/2}$, and $FSiO_{3/2}$.

22. The composition of claim 1 wherein the polysiloxane-polyoxyalkylene pendant-type copolymer component (e) is present in an amount from 0.5 to 2 parts based on the 100 parts of the polyol.

23. The composition of claim 1 wherein the chemical blowing agent is an isocyanate reactive blowing agent selected from the group consisting of water and formic acid and mixtures thereof.

24. The composition of claim 23 wherein the chemical blowing agent is water at less than 3 parts per 100 parts of polyol component (a) and/or formic acid at less than 2 parts per 100 parts polyol component (a).

25. The composition of claim 1 wherein component (f), the chain extender and/or crosslinker, is a polyol having a weight average molecular weight from 62 to 500.

26. The composition of claim 1 wherein component (f), the chain extender and/or crosslinker, is present in an amount from 0 to about 30 parts per 100 parts polyol component (a).

27. The composition of claim 1 wherein component (f) the chain extender is at least one selected from the group consisting of dipropylene glycol, tripropylene glycol, diethylene glycol, triethylene glycol, 1,4-butanediol, ethylene glycol, 2,3-butanediol, 2-methyl-1,3-propanediol, 1,2-propanediol, 1,3-propanediol and neopentylglycol.

28. The composition of claim 1 wherein component (f) the crosslinker is at least one selected from the group consisting of glycerine, trimethoylpropane, sorbitol and pentaerythritol.

29. The composition of claim 1 wherein component (f) the chain extender and/or crosslinker contains a primary or secondary amino group.

30. The composition of claim 29 wherein component (f) the chain extender and/or crosslinker is at least one selected from the group consisting of diethanolamine and monoethanolamine.

31. The composition of claim 1 wherein the filler is at least one selected from the group consisting of calcium carbonate, aluminum trihydrate, barium sulfate, microspheres of glass and microspheres of polymers.

32. The composition of claim 1 wherein the reinforcement is a fiber reinforcement selected from the group consisting of milled glass fiber, graphite fiber, natural mineral fibers, natural animal fibers, natural plant fibers, plate-like reinforcements and combinations thereof.

33. A polyurethane foam prepared from the composition of claim 1.

34. A process for making a fine-celled polyurethane foam comprising:
   i) mechanically frothing components a) through e), and optionally f), of the polyurethane foam-forming composition according to claim 1
   ii) curing the frothed mixture of (i),
wherein said frothing is performed simultaneously with or subsequent to mixing said components.

35. The process of claim 34 wherein said frothing comprises high-shear mixing.

36. The process of claim 34 wherein at least 2 components are premixed into a pre-blend prior to the addition of the remaining components.

37. The process of claim 34 wherein at least 2 components are premixed in a batch mixing process.

38. The process of claim 34 wherein said components are added into a mixer at same or different entrance points and if at different entrance points it may or may not represent different stages of the mixing process.

39. The process of claim 34 wherein a gas is injected and/or entrained into the frothing of the components.

40. The process of claim 39 wherein the gas is at least one selected from the group consisting of air, nitrogen and carbon dioxide.

41. The process of claim 40 wherein the gas is injected into a high-shear mixer under pressure.

42. The process of claim 34 wherein frothing is provided by an Oakes mixer, Firestone mixer, or other mixer that produces high shear conditions during mixing.

43. The process in claim 41 wherein the gas is entrained from above the surface of the components.

44. A polyurethane foam-forming composition which comprises:
   a) at least one polyol possessing a weight average molecular weight from about 500 to about 20,000;
   b) at least one polyisocyanate and/or polythioisocyanate;
   c) at least one polyurethane catalyst;
   d) at least one polysiloxane/polyoxyalkylene (AB)$_n$-type block silicone surfactant copolymer
in an amount of from 0.5 to 8 parts based on 100 parts of the polyol (a), wherein said copolymer is a non-hydrolyzable polysiloxane/polyoxyalkylene (AB)$_n$-type block silicone surfactant copolymer and with the provisos that the hydrolysable (AB)$_n$-type block silicone surfactant copolymer has a weight average molecular weight of from 65,000 to 250,000;
   (i) each siloxane block of the non-hydrolysable (AB)$_n$-type block silicone surfactant copolymer has a weight average molecular weight of from 300 to 10,000;
   (ii) each polyoxyalkylene block of the non-hydrolysable (AB)$_n$-type block silicone surfactant copolymer has a weight average molecular weight of from 2,000 to 4,000; and
   (iii) the siloxane blocks constitute from 20 to 50 weight percent of said copolymer and the polyoxyalkylene blocks constitute 80 to 50 weight percent of said copolymer; and e) at least one non-hydrolyzable polysiloxane-polyoxyalkylene pendant-type silicone surfactant copolymer comprising repeating siloxane units having the general structure:

wherein
   R is methyl;
   a has an average value over all siloxane units from 1 to 2.9;
   b has an average value over all siloxane units from 0.1 to 1;
   each F is a polyoxyalkylene having the formula:

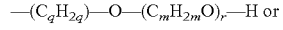

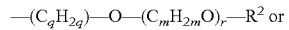

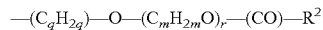

where each m is independently an integer of from 2 to 4; each q is independently an integer from 2 to 6; r is greater than 1, R$^2$ is methyl,
   in an amount of from 0.1 to 4 parts based on 100 parts of the polyol (a), and with the provisos that
   (i) the non-hydrolyzable pendant-type copolymer has a weight average molecular weight of from 4,500 to 14,000;
   (ii) the siloxane blocks of the non-hydrolyzable pendant-type copolymer constitute of from 26 to 49 weight percent of the copolymer,
   (iii) each polyoxyalkylene block of the non-hydrolyzable pendant-type copolymer has a weight average molecular weight of from 550 to 1,500, and contains from 75 to 100 weight percent oxyethylene groups; and
   (iv) the sum of a and b has an average value over all siloxane units from 1.5 to 3.0; and,
   f) optionally, at least one component selected from the group consisting of polymer and/or copolymer, blowing agent, chain extender, crosslinkers, filler, reinforcement, pigments, tints, colorants, flame retardant, antioxidants, thermal or thermal-oxidative degradation inhibitors, UV stabilizers, LTV absorbers, anti-static agent, biocide, anti-microbial agent and gas-fade inhibiting agent.

45. The composition of claim 44 wherein the polysiloxane/polyoxyalkylene (AB)$_n$-type block copolymer component (d) is a non-hydrolyzable (AB)$_n$-type silicone surfactant having the general structure:

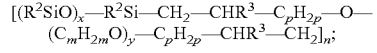

wherein each occurrence of R is methyl, and x is greater than 4, m equals an integer or a mixture of integers from 2 to 4, y is greater than 10, n is greater than 4, p is equal to an integer or mixture of integers from 0 to 4 and each occurrence of R$^3$ is methyl or a hydrogen.

46. The composition of claim 45 wherein p is 1.

47. The composition of claim 44 wherein the polysiloxane/polyoxyalkylene (AB)$_n$-type block copolymer component (d) is a non-hydrolyzable (AB)$_n$-type silicone surfactant having the general structure:

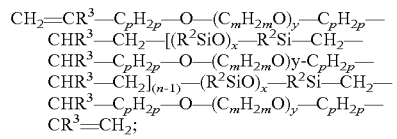

wherein each occurrence of R is methyl, and x is greater than 4, m equals an integer or a mixture of integers from 2 to 4, y is greater than 10, n is greater than 4, p is equal to an integer or mixture of integers from 0 to 4 and each occurrence of $R^3$ is methyl or a hydrogen.

48. The composition of claim 47 wherein $R^3$ is a methyl group.

49. The composition of claim 47 wherein p is 1.

50. The composition of claim 44 wherein the polysiloxane/polyoxyalkylene $(AB)_n$-type block copolymer component (d) is a non-hydrolyzable $D(AB)_nAD$ silicone surfactant having the structure:

$$D\text{-}[(R^2SiO)_x\text{—}R^2Si\text{—}CH_2\text{—}CHR^3\text{—}C_pH_{2p}\text{—}O\text{—}(C_mH_{2m}O)_y\text{—}C_pH_{2p}\text{—}CHR^3\text{—}CH_2]_n$$

$$\text{—}(R_2SiO)_x\text{—}R_2Si\text{-}D;$$

wherein each occurrence of R is methyl, and x is greater than 4, m equals an integer or a mixture of integers from 2 to 4, y is greater than 10, n is greater than 4, p is equal to an integer or mixture of integers from 0 to 4 and each occurrence of $R^3$ is methyl or a hydrogen; and D is $\text{—}(C_qH_{2q})\text{—}O\text{—}(C_mH_{2m}O)_z\text{-}E$; q equals an integer or mixture of integers from 2 to 6; and z is 0 to 80; E is hydrogen, or a saturated monovalent hydrocarbon radical having from 1 to 20 carbons or $\text{—}(CO)\text{—}R$.

51. The composition of claim 50 wherein p is 1.

52. The composition of claim 50 wherein q is 3 and/or 4.

* * * * *